United States Patent [19]

Ozaki et al.

[11] Patent Number: 4,754,834
[45] Date of Patent: Jul. 5, 1988

[54] FOUR WHEEL DRIVE SYSTEM HAVING DRIVING FORCE DISTRIBUTION CONTROL RESPONSIVE TO VEHICLE LATERAL ACCELERATION

[75] Inventors: Kiyotaka Ozaki, Yokosuka; Shuuji Torii, Yokohama, both of Japan

[73] Assignee: Nissan Motor Co., Ltd., Yokohama, Japan

[21] Appl. No.: 820,055

[22] Filed: Jan. 21, 1986

[30] Foreign Application Priority Data

Jan. 21, 1985 [JP] Japan ................... 60-9694

[51] Int. Cl.$^4$ ............................................. B60K 23/08
[52] U.S. Cl. ..................................... 180/233; 74/866; 180/247; 192/0.076; 364/424.1
[58] Field of Search .............. 180/233, 247, 248, 249, 180/197; 192/0.052, 0.075, 0.076; 364/424.1, 426; 74/866, 861

[56] References Cited

U.S. PATENT DOCUMENTS

| 4,466,502 | 8/1984 | Sakai ................... 180/247 |
| 4,473,143 | 9/1984 | Windsor ............... 192/0.052 |
| 4,484,653 | 11/1984 | Horikoshi et al. ...... 180/233 |
| 4,497,397 | 2/1985 | Windsor et al. ........ 192/0.076 |
| 4,558,414 | 12/1985 | Sakakiyama ........... 180/233 |
| 4,558,772 | 12/1985 | Grimes et al. ......... 192/0.076 |
| 4,562,541 | 12/1985 | Sakakiyama ........... 180/233 X |
| 4,583,627 | 4/1986 | Kumura et al. ........ 192/0.076 |
| 4,586,583 | 5/1986 | Yamakawa et al. ..... 180/247 |

FOREIGN PATENT DOCUMENTS

| 0043237 | 1/1982 | European Pat. Off. |
| 3313182 | 10/1983 | Fed. Rep. of Germany. |
| 3345470 | 7/1984 | Fed. Rep. of Germany. |
| 3427725 | 8/1985 | Fed. Rep. of Germany. |
| 12827 | 1/1983 | Japan .................. 180/233 |
| 160630 | 9/1984 | Japan .................. 180/233 |
| 2104178 | 3/1983 | United Kingdom. |
| 2118666 | 11/1983 | United Kingdom. |

OTHER PUBLICATIONS

Jidosha Kogaku, published by Tetsudo Nihon Company, Ltd., vol. 33, No. 8, pp. 56-62, Aug. 1, 1984. (Japanese)

Primary Examiner—David M. Mitchell
Assistant Examiner—Mitchell J. Hill
Attorney, Agent, or Firm—Foley & Lardner, Schwartz, Jeffery, Schwaab, Mack, Blumenthal & Evans

[57] ABSTRACT

A four wheel drive system of a vehicle has a transfer clutch capable of varying torque transmitted therethrough from an engine to front wheels. This torque is controlled by a driving force distribution control unit in response to sensor signals of vehicle cornering behavior sensor such as a lateral acceleration sensor, vehicle speed sensor, transmission gear position sensor, and accelerator position sensor. The control unit determines a driving force distribution ratio between the front wheel driving force and the rear wheel driving force in accordance with the sensed lateral acceleration in such a manner that the share of the driving force apportioned to the front wheels is decreased with increase of the lateral acceleration. The control unit estimates a total driving force produced by the engine and transmitted through the transmission to the transfer, from the vehicle speed, gear position and accelerator position, and determines the torque of the transfer clutch from the total driving force and the distribution ratio.

9 Claims, 5 Drawing Sheets

FOUR WHEEL DRIVE SYSTEM HAVING DRIVING FORCE DISTRIBUTION CONTROL RESPONSIVE TO VEHICLE LATERAL ACCELERATION

BACKGROUND OF THE INVENTION

The present invention relates to a control system for controlling the distribution of the driving force between front and rear wheel pairs of a four wheel drive vehicle by varying the driving force transmitted to either of the front and rear wheel pairs.

One conventional example of the four wheel drive system is shown in FIG. 9 (cf. "Jidō sha Kō gaku" vol. 33, no. 8, published by Tetsudō Nihon Company Ltd. Aug. 1, 1984, pages 56–62). This system is a so-called full-time four wheel drive system having a center differential between a front wheel propeller shaft and a rear wheel propeller shaft, and a dog clutch for locking the center differential. In this four wheel drive system, the driving force distribution ratio between the front wheel driving force and the rear wheel driving force is 1:1. Therefore, when the center differential is locked by the dog clutch, this system increases the tendency to understeer although it can improve the limit cornering performance of the vehicle. When the center differential is unlocked, this system can solve the problem of understeer, but it deteriorates the limit cornering performance.

Furthermore, it is impossible to control the direction of the vehicle with the aid of power slide obtained by operation of the accelerator pedal.

In another conventional example, a drive system is switched between a two wheel drive mode and a four wheel drive mode by a clutch in a simple on-off manner. In this system, the changeover between the 2WD and 4WD modes during motion of the vehicle is difficult, and even dagerous because an abrupt change of the drive state impairs the vehicle stability.

SUMMARY OF THE INVENTION

It is an object of the present invention to provide a four wheel drive system capable of distirbuting the driving force produced by the engine between front and rear wheels in an adequately controlled ratio.

It is another object of the present invention to provide a four wheel drive system which distributes the driving force between the front and rear wheels equally in a rectilinear motion of the vehicle to improve the accelerating ability, and increases the allotment of either of the front and rear wheels to enable the vehicle directional control due to power slide.

According to the present invention, the four wheel drive system for a vehicle having an engine, a transmission and first and second wheel paris, comprises a transfer, various sensors, and a driving force distribution control means.

The transfer has an input rotational member such as an input shaft for receiving torque from the transmission, a first output rotational member such as a shaft connected with the input member for driving the first wheel pair, a second output rotational member such as a shaft for driving the second wheel pair, and a transfer clutch provided between the input member and the second output member for varying torque transmitted through the transfer clutch from the input member to the second output member by varying a clutch engagement force.

The sensors are cornering behavior sensor for sensing a cornering behavior of the vehicle and producing a signal representing a lateral acceleration of the vehicle, vehicle speed sensor for sensing a vehicle speed, accelerator sensor for sensing a position of an accelerator such as a throttle valve or an accelerator pedal of the engine, and gear position sensor for sensing a gear position of the transmission.

The driving force distribution control means are connected with these sensors. First the control means determines a driving force distribution ratio between a driving force for the first wheel pair and a driving force for the second wheel pair in accordance with the signal of the cornering behavior sensor. Secondly, the control means estimates a total driving force produced by the engine and transmitted through the transmission to the input member of the transfer, from the vehicle speed, accelerator position and gear position sensed by the vehicle speed sensor, accelerator sensor and gear position sensor. From the thus-determined distribution ratio and total driving force, the control means determines a desired magnitude of the torque transmitted through the transfer clutch to the second wheel pairs, and controls the transfer clutch so that the torque of the desired magnitude is actually transmitted through the transfer clutch.

DETAILED DESCRIPTION OF THE INVENTION

Figure 8:
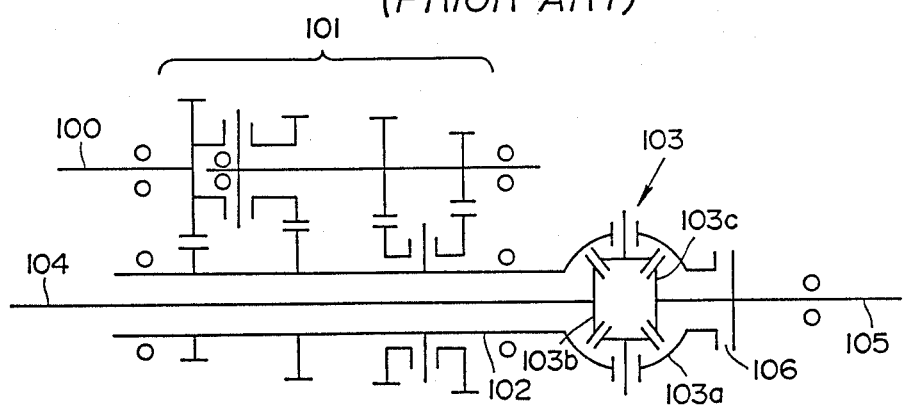
FIG. 8 is a skeleton diagram of a conventional four wheel drive system.
Figure 5:
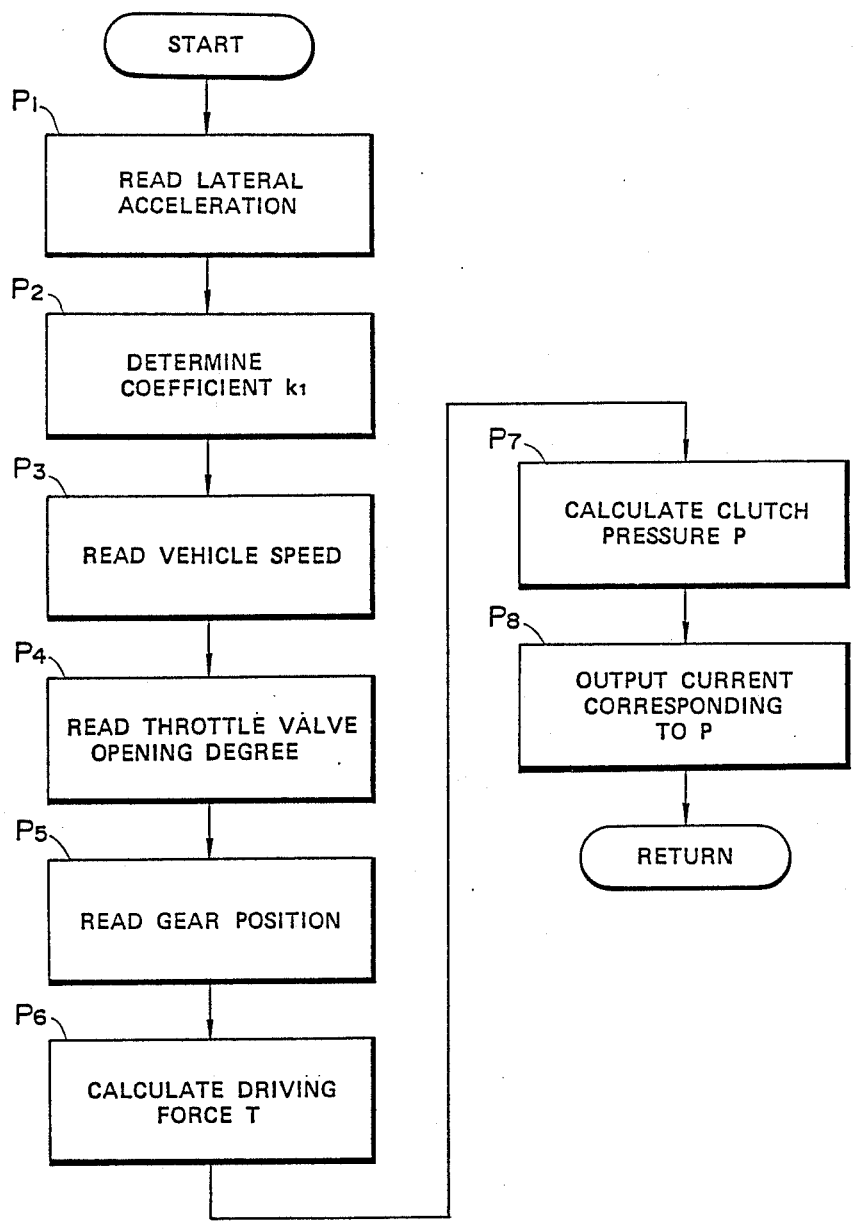
FIG. 5 is a flowchart of a program performed by the control unit of FIG. 4.

The above-mentioned conventional full-time four wheel drive system is shown in FIG. 8. This system has a transmission 101, a center differential 103, and a dog clutch 106. The transmission 101 has an input shaft 100 for receiving a driving force transmitted from an engine through a master clutch, and a hollow output shaft 102. The center differential 103 has a case 103a integral with the transmission output shaft 102, a side gear 103b connected to a front wheel output shaft 104 for driving front wheels, and a side gear 103c connected to a rear wheel output shaft 105 for driving rear wheels. The dog clutch 106 is disposed between the differential case 103a and the rear wheel output shaft 105 for locking the front and rear wheel output shafts 104 and 105. The driving force of the engine is distributed through the center differential 103 between the front and rear wheel output shafts 104 and 105.

One embodiment of the present invention is shown in FIGS. 1–7.

Figure 1:
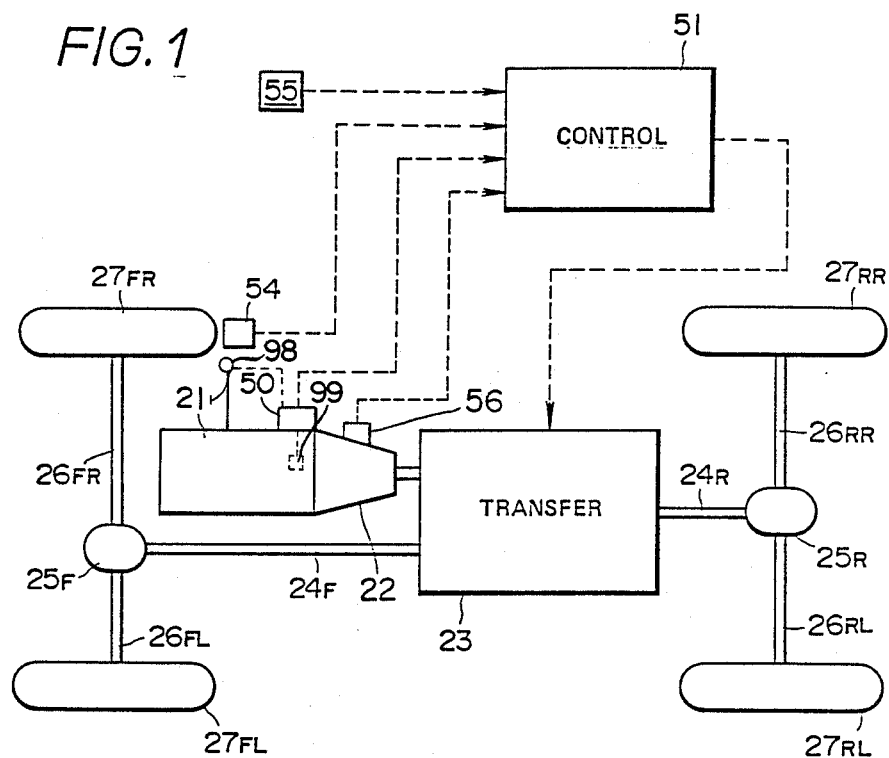
FIG. 1 is a schematic view of a four wheel drive vehicle for showing one embodiment of the present invention.

A four wheel drive vehicle shown in FIG. 1 has an engine 21, including a throttle valve 99 a transmission 22 united with the engine, an accelerator pedal 98 and a transfer 23 which connects an output shaft of the transmission to a rear wheel propeller shaft 24R and a front wheel propeller shaft 24F. The rear propeller shaft 24R is connected to right and left wheels 27RR and 27RL through a rear differential 25R and right and left axles 26RR and 26RL. The front propeller shaft 24F is connected to right and left front wheels 27FR and 27FL through a front differential 25F and right and left axles 26FR and 26FL.

Figure 2:
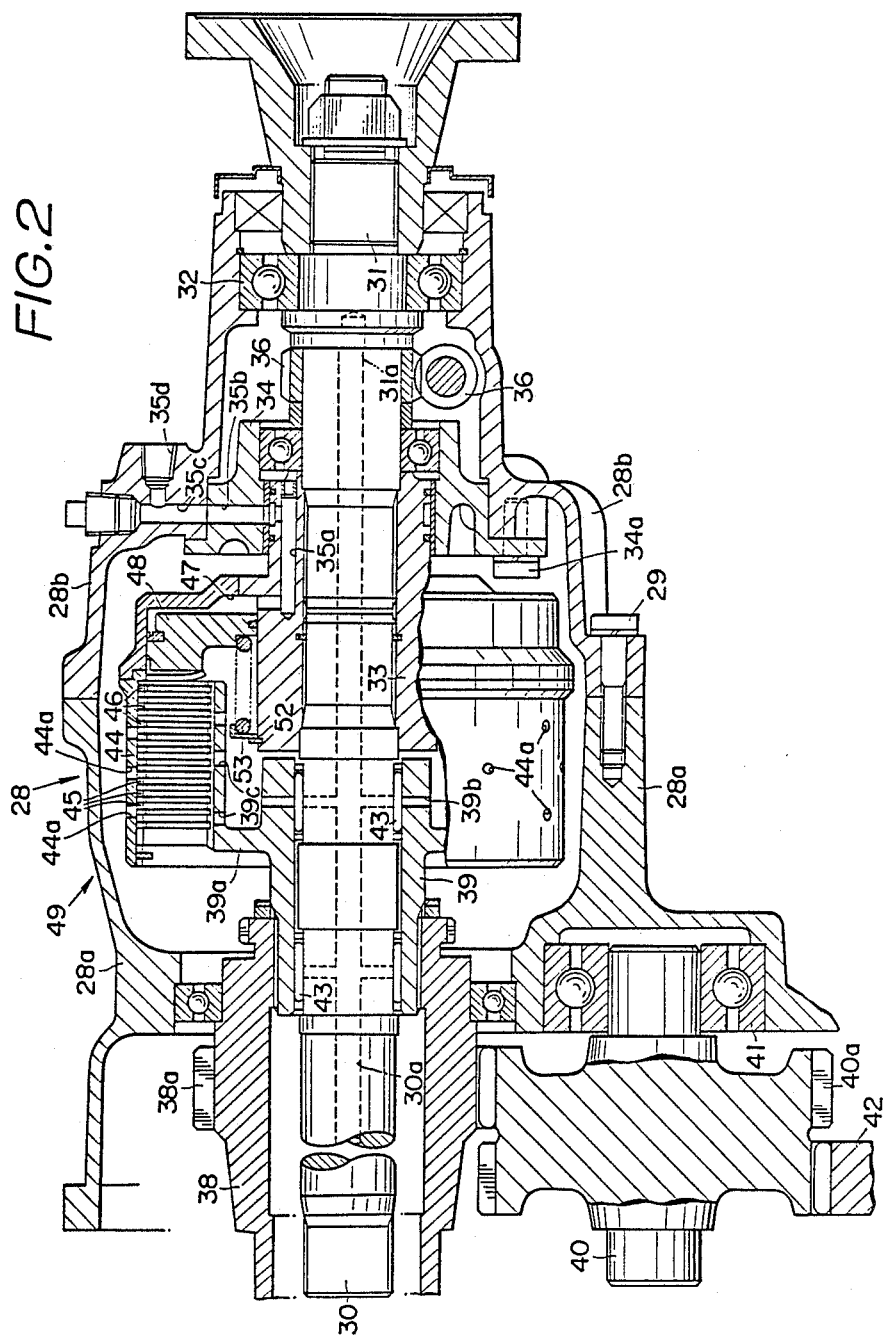
FIG. 2 is a sectional view of a transfer of the vehicle of FIG. 1.

As shown in FIG. 2, the transfer 23 has a transfer case 28 consisting of two members 28a and 28b joined together by bolts 29. The case 28 contains an input shaft 30 which is directly connected with the output shaft of the transmission 22. A bearing 32 supports a rear wheel output shaft 31 which is connected with the rear propeller shaft 24R. An internally splined coupling member 33 of a hollow cylindrical shape fits over the ends of the input shaft 30 and the rear wheel output shaft 31, so that both shafts rotate together. The coupling member 33 is rotatably received in a hole of a bearing holder 34 which is fixed to the transfer case 28 by bolts 34a.

The input shaft 30 is encircled coaxially by first and second hollow shafts 38 and 39 which are connected with each other by means of splines. The second hollow shaft 39 is rotatably mounted on the input shaft 30 through one or more needle bearings 43. The first hollow shaft 38 has a drive gear 38a formed on the outer surface. The drive gear 38a is in engagement with a counter gear 40a formed on the outer surface of a counter shaft 40, which is rotatably supported on the transfer case 28 through a bearing 41. The counter gear 40a is in engagement with a driven gear 42 formed in a front wheel output shaft which is connected with the front wheel propeller shaft 24F.

A hydraulic type multiple disc friction clutch (transfer clutch) 49 is provided between the coupling member 33 driven by the input shaft 30, and the second hollow shaft 39. A clutch drum 44 is formed on the outer periphery of the coupling member 33, and a clutch hub 39a is formed on the outer periphery of the second hollow shaft 39. The transfer clutch 49 has an alternating series of driving plates 45 engaging with internal splines of the clutch drum 44 and driven plates 46 engaging with external splines of the clutch hub 39a. A piston 48 of a ring shape is axially slidable. Both of outer and inner periphery of the piston 48 are sealed in a liquid-tight manner to form an oil chamber 47. A spring 53 is disposed under compression between the piston 48 and a retainer 52 fixed to the coupling member 33 for pushing the piston 48 toward the oil chamber 47. The oil chamber 47 is in fluid communication with an oil port 35d of the transfer case 28 via a first oil passage 35a formed in the coupling member 33, a second oil passage 35b formed in the bearing holder 34 and a third oil passage 35c formed in the transfer case 28. When a high pressure oil is supplied to the oil chamber 47 from the oil port 35d through the third, second and first oil passages 35c, 35b and 35a, the piston 48 moves leftwardly as viewed in FIG. 2 against the biasing force of the spring 53 and brings the driving and driven plates 45 and 46 into frictional contact with each other. In this state, the clutch 49 connects the input shaft 30 to the front wheel output shaft to drive the front wheels.

First and second lubricant passages 30a and 31a are formed, respectively, in the input shaft 30 and the rear wheel output shaft 31 for conveying a lubricating oil to the needle bearings 43 and other parts. First, second and third clutch lubricant passages 39b, 39c and 44a are formed, respectively, in the second hollow shaft 39, the hub 39a and the drum 44 for lubricating the driving and driven plates 45 and 46 of the clutch 49. A reference numeral 36 denotes a pinion for speed detection.

As shown in FIG. 1, a control apparatus 51 is connected with a gear position sensor 56 for sensing a gear shift position of the transmission 22, a vehicle speed sensor 54 for sensing a vehicle speed, a vehicle cornering behavior sensor such as a lateral acceleration sensor 55 for sensing a lateral acceleration acting on the vehicle body, and an accelerator sensor 50 for sensing an opening degree of throttle valve 99 of the engine 21, of the position of accelerator pedal 98. The control apparatus 51 receives sensor output signals representing the transmission gear position, the vehicle speed, the lateral acceleration and the throttle valve opening degree. The accelerator sensor 50 may be arranged to sense the position (i.e. depression degree) of an accelerator pedal.

Figure 3:
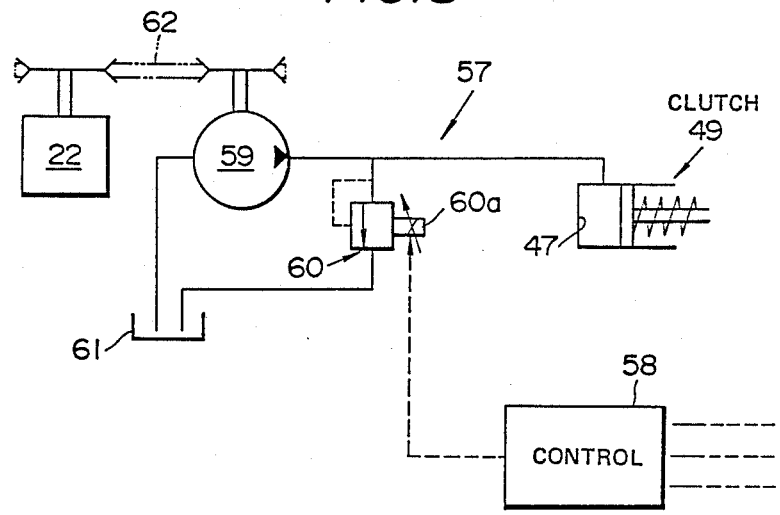
FIG. 3 is a schematic view of a hydraulic system for actuating a transfer clutch of FIG. 2.

As shown in FIG. 3, the control apparatus 51 has a hydraulic circuit 57 for supplying the pressure oil to the oil chamber 47 of the friction clutch 49 and an electrical control circuit or unit 58 such as a microcomputer for controlling the oil pressure produced by the hydraulic circuit 57. The hydraulic circuit 57 has a pump 59 connected with the oil chamber 47 of the clutch 49, and an electromagnetic (solenoid) valve 60 provided between the oil chamber 47 of the clutch 49 and a reservoir tank 61. The pump 59 is driven by the engine 22 of the vehicle through a belt 62. The pump 59 pressurizes the oil sucked from the tank 61, and discharges the oil of a constant pressure. The electromagnetic valve 60 has a solenoid 60a connected with the control circuit 58. The valve 60 varies its opening degree in accordance with the magnitude of a current supplied to the solenoid 60a from the control circuit 58. The oil chamber 47 of the clutch 49 and the reservoir tank 61 are kept in fluid communication with each other through an open area of the electromagnetic valve 60 corresponding to the current supplied to the solenoid 60a. In this way, the electromagnetic valve 60 controls the oil pressure (clutch pressure) in the oil chamber 47 by allowing the oil discharged from the pump 59 to return to the reservoir tank 61 at a controlled rate. The electromagnetic valve 60 further serves as a pressure relief. When the oil pressure in the hydraulic circuit 57 becomes too high, the valve 60 allows the emergency escape of the oil from the chamber 47 to the tank 61.

Figure 4:
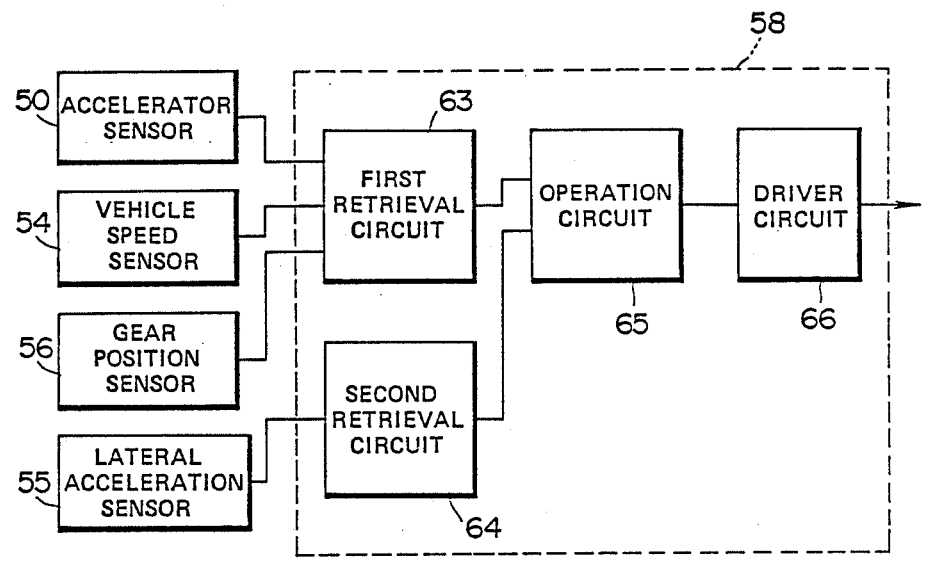
FIG. 4 is a block diagram of a control unit of FIG. 3.

As shown in FIG. 4, the control circuit 58 has first and second retrieval circuits 63 and 64, an operation circuit 65 and a driver circuit 66. The gear position sensor 56, the vehicle speed sensor 54 and the accelerator sensor 50 are connected to the first retrieval circuit 63. The lateral acceleration sensor 55 is connected to the second retrieval circuit 64. The first and second retrieval circuits 63 and 64 are connected to the operation circuit 65, which is connected to the driver circuit 66. The first retrieval circuit 63 determines a total driving force T by retrieving data from a map shown in FIG. 6 corresponding to the gear position of the transmission 22, vehicle speed and throttle valve opening degree. The second retrieval circuit 64 determines a coefficient $k_1$ determining a distribution ratio between a front driving force apportioned to the front wheels and a rear driving force apportioned to the rear wheels by retrieving data corresponding to the vehicle lateral acceleration from a map shown in FIG. 7. The operation circuit 65 determines a pressure (clutch pressure) P of the oil to be supplied to the oil chamber 47 of the clutch 49, from the driving force T determined by the first retrievals circuit 63 and the coefficient $k_1$ determined by the second retrieval circuit 64 by using the following equation (1).

$$P = (k_1/R_2) \cdot (T/2) \qquad (1)$$

In the equation (1), $R_2$ is a coefficient inherent in the friction clutch 49, given by the following equation (2).

$$R_2 = 2n \cdot \mu \cdot A \cdot R_m \qquad (2)$$

where n is the number of the driving plates, $\mu$ is a friction coefficient between the driving plates 45 and the driven plates 46, A is an area of the piston 48 receiving pressure, and $R_m$ is a radius effective for torque transmission, of the driving and driven plates 45 and 46.

The driver circuit 66 sends a current whose magnitude corresponds to the thus-determined clutch pressure P, to the solenoid 60a of the electromagnetic valve 60.

The control apparatus 51 of the present invention distributes the driving force produced by the engine 21 between the front wheel pair and the rear wheel pair as follow: The control circuit 58 repeats a program shown in FIG. 5 at regular intervals.

At a step $P_1$, the control circuit 58 reads an instantaneous value of the lateral acceleration represented by the output signal of the lateral acceleration sensor 55. At a step $P_2$, the control circuit 58 determines the coefficient $k_1$ indicative of the driving force distribution ratio between the front and rear wheels by looking up a value of $k_1$ corresponding to the sensed vehicle lateral acceleration from the map of FIG. 7. That is, the second retrieval circuit 64 obtains a value of $k_1$ corresponding to the sensed lateral acceleration which represents a cornering behavior of the vehicle.

The coefficient $k_1$ is 100 percent when the driving force distribution ratio between the front and rear wheels is 50:50. The coefficient $k_1$ is zero percent when the driving force distribution ratio between the front wheels and the rear wheels is 0:100. The coefficient $k_1$ decreases linearly as the lateral acceleration increases.

Figure 6:
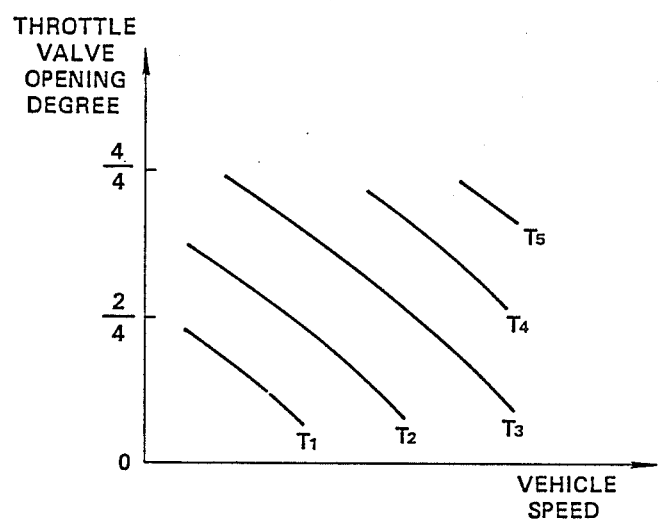
FIG. 6 is a diagram showing equal driving force curves on a graph throttle valve opening degree versus vehicle speed.
Figure 7:
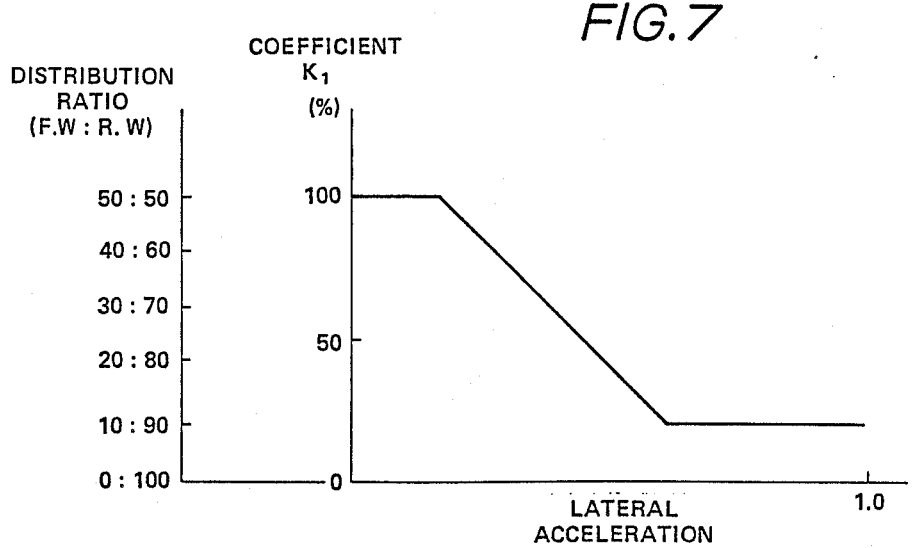
FIG. 7 is a diagram showing a relationship between a driving force distribution ratio and a vehicle lateral acceleration.

Then, the control circuit 58 reads the vehicle speed from the output signal of the vehicle speed sensor 54 at a step $P_3$, reads the throttle valve opening degree from the output signal of the accelerator sensor 50 at a step $P_4$, and reads the transmission gear position from the output signal of the gear position sensor 56 at a step $P_5$. At a step $P_6$, the control circuit 58 determines the driving force T of the vehicle from the vehicle speed, throttle valve opening degree and gear position by using the map of FIG. 6. In FIG. 6, each of solid lines is drawn through points of equal magnitude $T_1$, $T_2$, $T_3$, $T_4$ or $T_5$ of the driving force T ($T_1 < T_2 < T_3 < T_4 < T_5$).

At a step $P_7$, the control circuit 58 determines the clutch pressure P from the coefficient $k_1$ determined at the step $P_6$ and the total driving force T determined at the step $P_6$ according to the equation (1). At a step $P_8$, the driver circuit 66 supplies a current of a magnitude corresponding to the thus-determined clutch pressure P to the electromagnetic valve 60 to supply the clutch pressure P to the oil chamber 47 of the friction clutch. Therefore, the clutch 49 of the transfer 23 transmits the driving force corresponding to the value obtained by multiplying the driving force T by the coefficient $k_1$ to the front wheels 27FL and 27FR, so that the driving force distribution ratio is controlled in accordance with the vehicle lateral acceleration. When the vehicle is in a condition in which the vehicle motion is approximately rectilinear and the vehicle lateral acceleration is small, the system of the present invention endows the vehicle with a satisfactory accelerating ability by apportioning equal amount of the driving force to each of the front and rear wheel pairs. When the vehicle is in a curvilinear motion and the vehicle lateral acceleration is high, the system of the present invention transmits a great driving force to the rear wheels, so that the driver can utilize power slide obtainable through the accelerator operation for the direction control of the vehicle. It is possible to negotiate a tight corner, without reducing the vehicle speed, by causing the vehicle rear end to slide by reason of power slide.

It is optional to employ an electromagnetic clutch as the clutch 49 of the transfer 23.

It is optional to employ a steering angle sensor as the vehicle cornering behavior sensor, instead of the lateral acceleration sensor. In this case, the cornering behavior sensor produces an output signal representing the vehicle lateral acceleration in accordance with the sensed steering angle of the vehicle and the vehicle speed sensed by the vehicle speed sensor.

What is claimed is:

1. A four wheel drive system for a vehicle having an engine, a transmission, and first and second wheel pairs, comprising:

a transfer means having an input rotational member for receiving torque from said transmission, a first output rotational member connected with said input member for driving said first wheel pair, a second output rotational member for driving said second wheel pair, and a transfer clutch provided between said input member and said second output member for varying torque transmitted from said input member to said second output member by varying a clutch engagement force, a cornering behavior sensor for sensing a corner behavior of said vehicle and producing a signal representing a lateral acceleration of said vehicle, a vehicle speed sensor for sensing a vehicle speed of said vehicle, an accelerator sensor for sensing a position of an accelerator of said engine, a gear position sensor for sensing a gear position of said transmission, and driving force distribution control means for determining a driving force distribution ratio between a driving force for said first wheel pair in accordance with said signal of said vehicle cornering behavior sensor, estimating a total driving force transmitted from said engine to said input member of said transfer through said transmission from the vehicle speed, accelerator position and gear position sensed by said vehicle speed sensor, accelerator sensor and gear position sensor, determining a desired magnitude of the torque transmitted through said transfer clutch from said distribution ratio and said total driving force, and controlling the torque transmitted through said transfer clutch in accordance with said desired magnitude, wherein said control means continuously decreases a share of the driving force apportioned to said second wheels as the vehicle lateral acceleration increases.

2. A system according to claim 1 wherein said control means distributes the driving force equally between said first and second wheel pairs when the vehicle lateral acceleration is lower than a predetermined lower threshold value.

3. A system according to claim 2 wherein said first wheels are rear wheels and said second wheels are front wheels.

4. A system according to claim 3 wherein said cornering behavior sensor senses the vehicle lateral acceleration directly.

5. A system according to claim 3 wherein said accelerator sensor senses an opening degree of a throttle valve of said engine.

6. A system according to claim 3 wherein said accelerator sensor senses a position of an accelerator pedal.

7. A system according to claim 3 wherein said transfer clutch is a hydraulic type multiple disc friction clutch.

8. A system according to claim 3 wherein said control means maintains the share of the driving force apportioned to said second wheel pair constantly at a minimum value greater than zero when the vehicle lateral acceleration is greater than a predetermined upper threshold value greater than said lower threshold value.

9. A system according to claim 1, wherein said first wheels are rear wheels and said second wheels are front wheels.

* * * * *